UNITED STATES PATENT OFFICE.

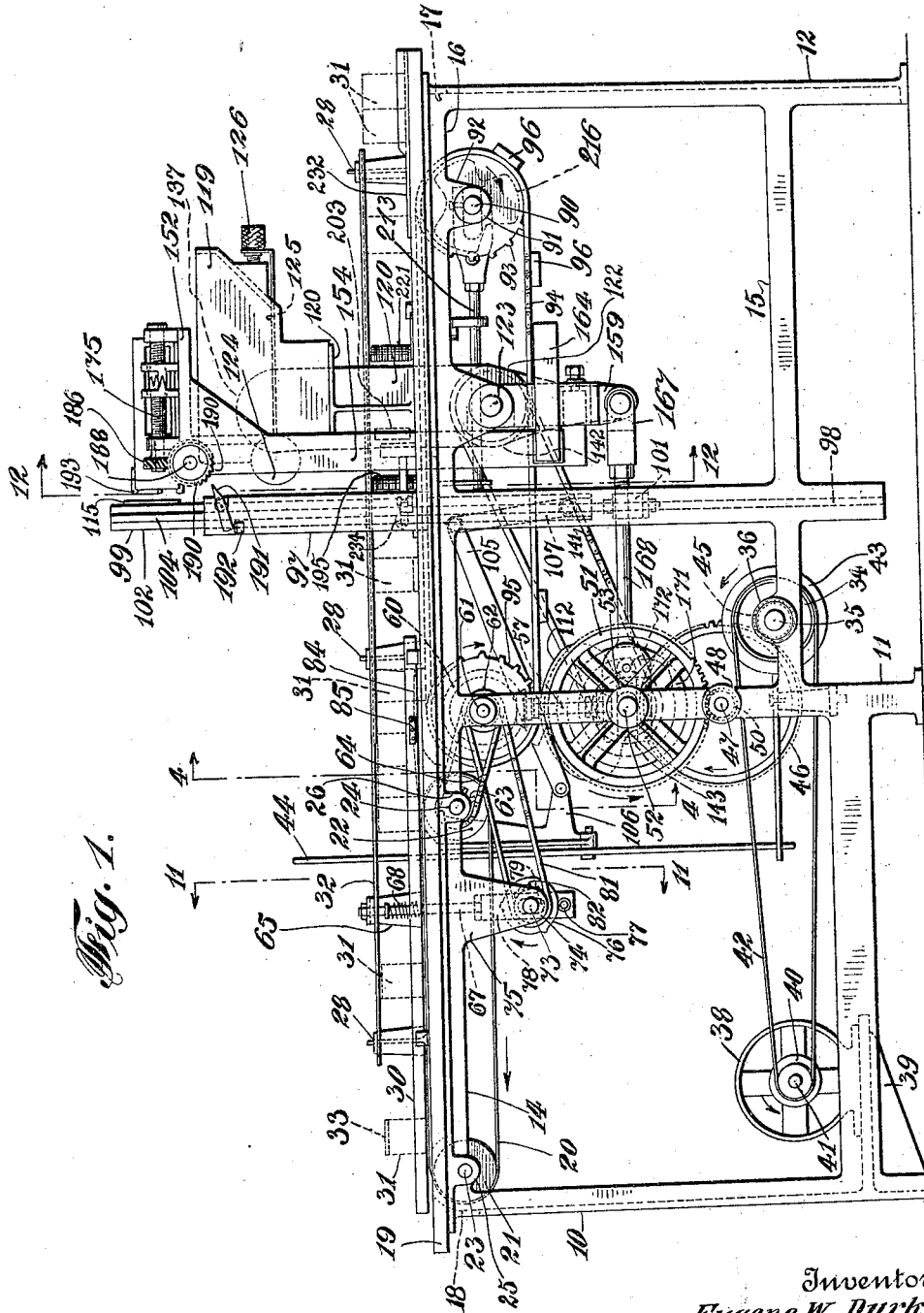

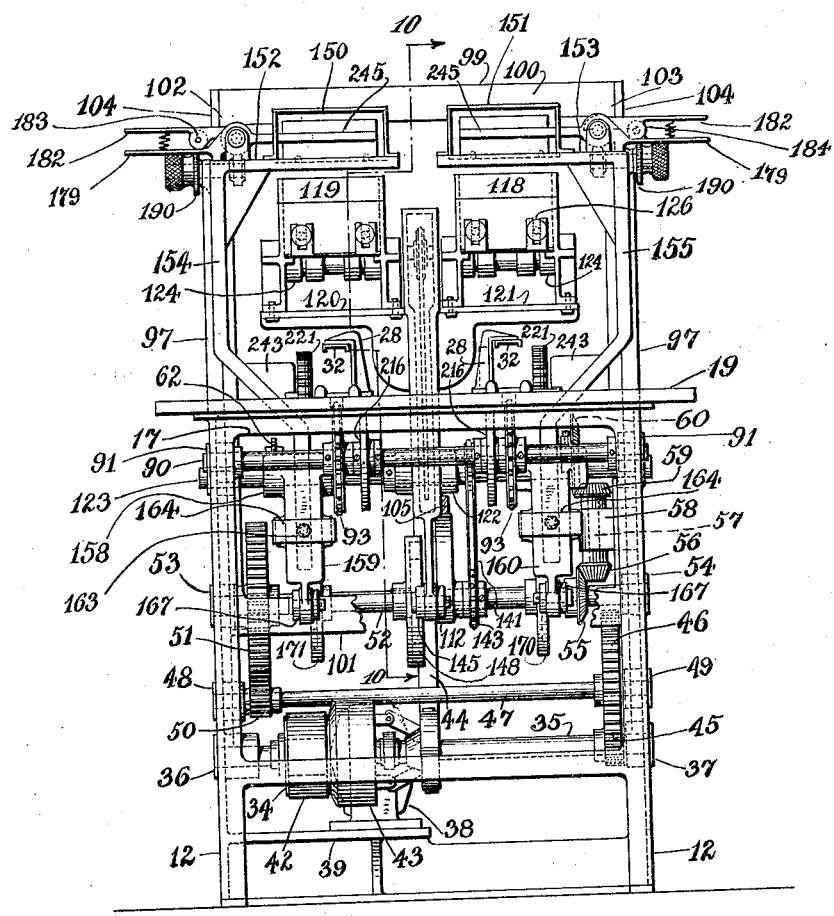

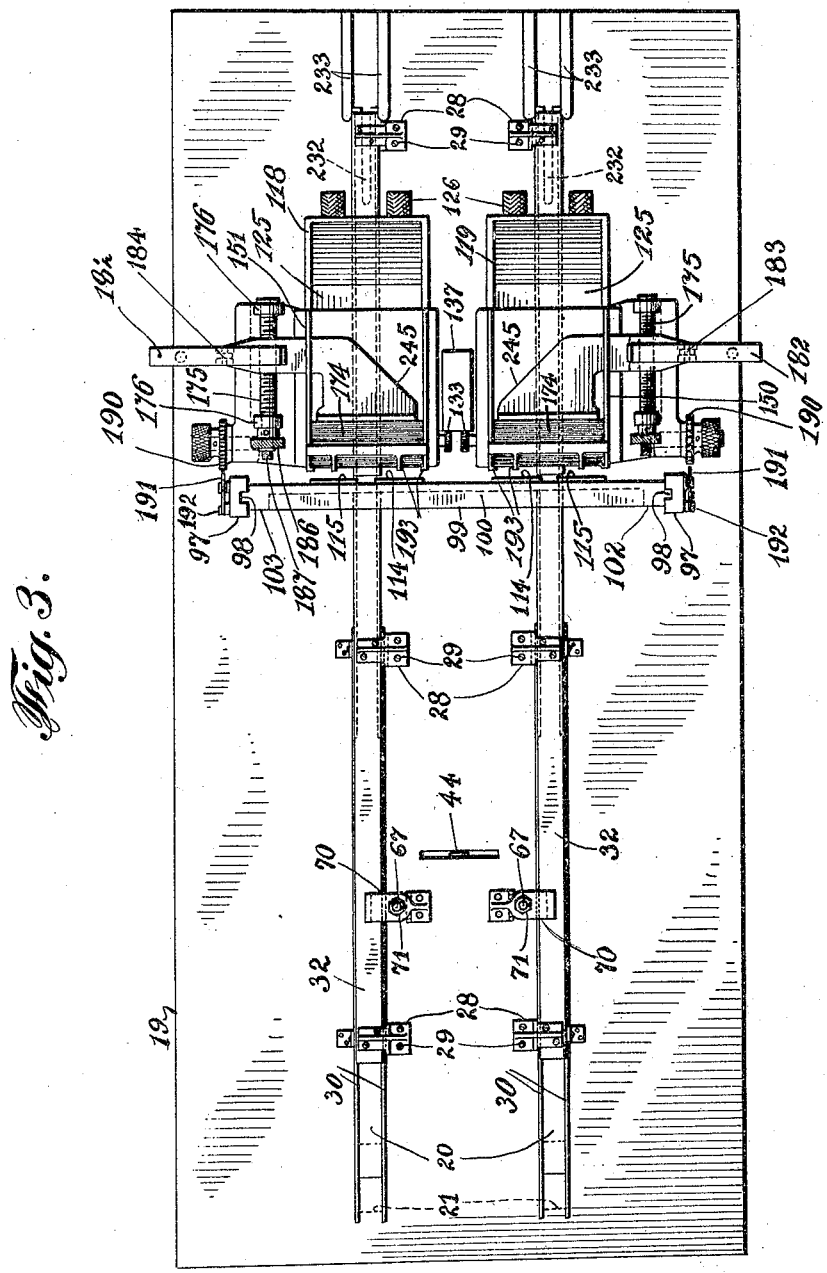

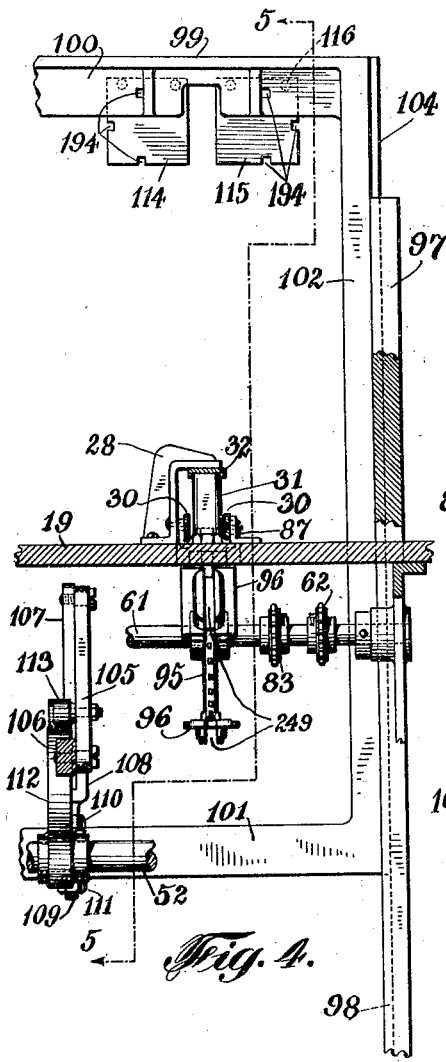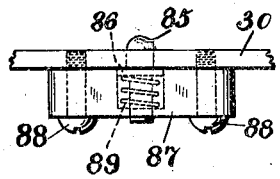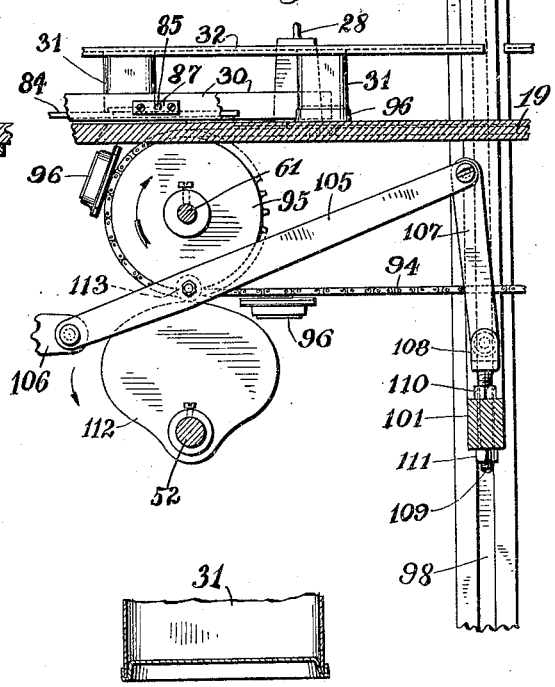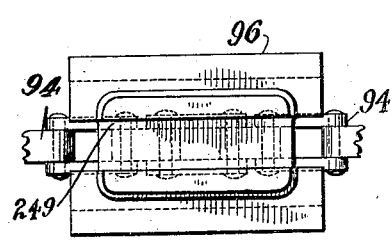

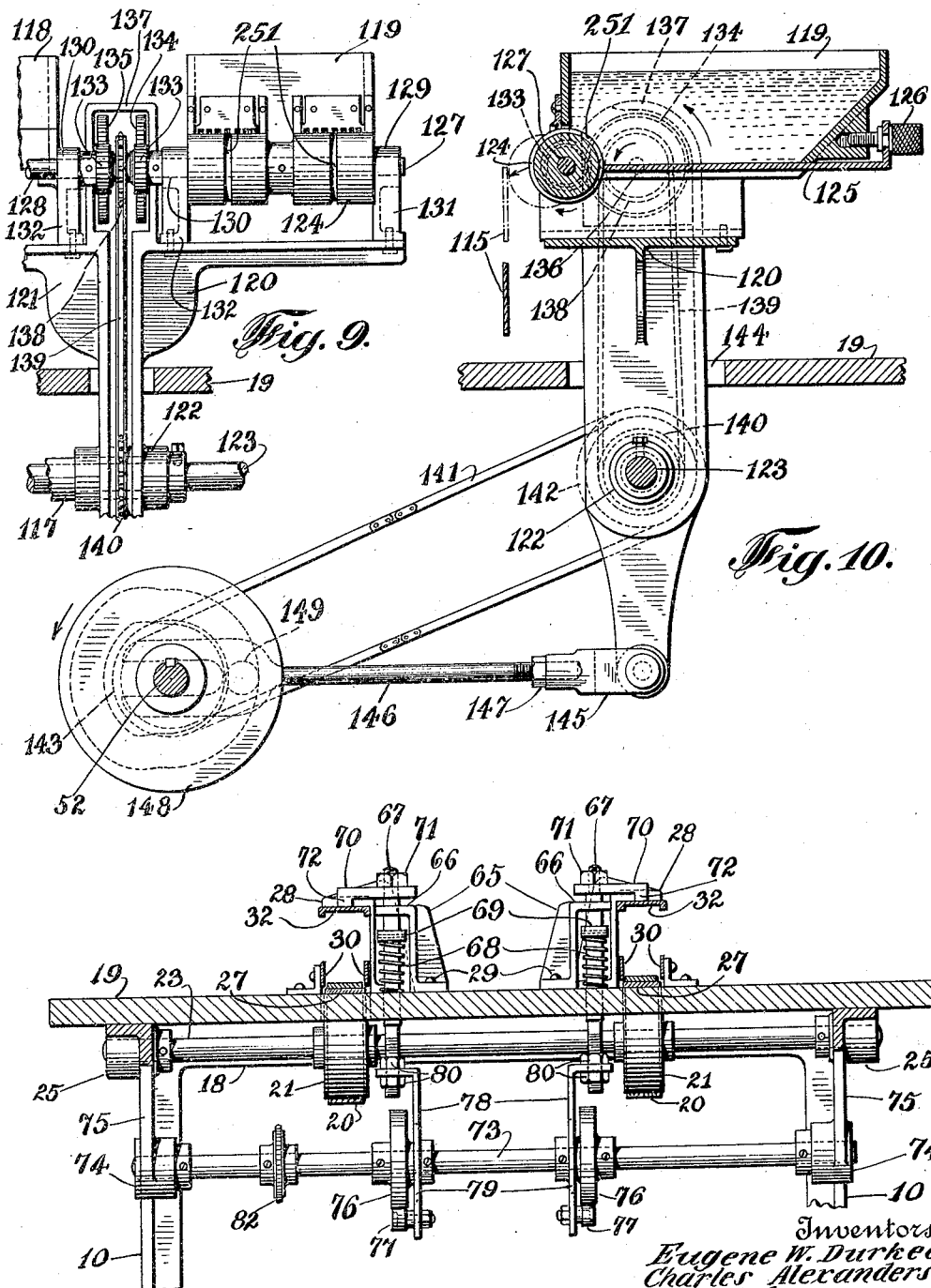

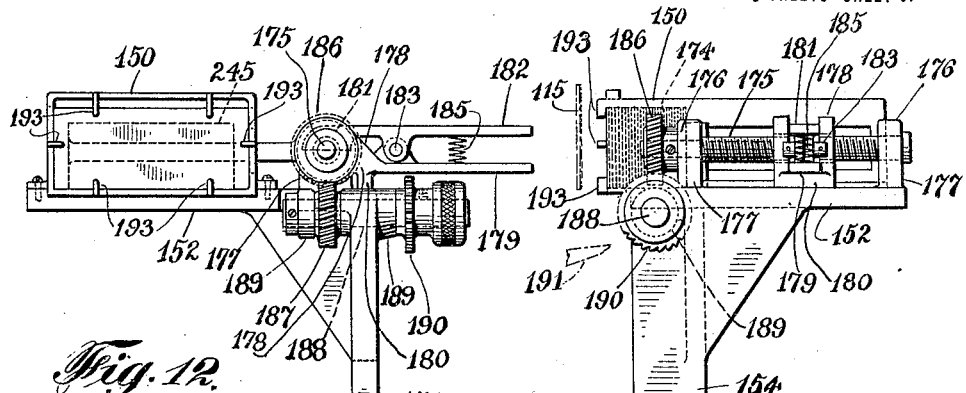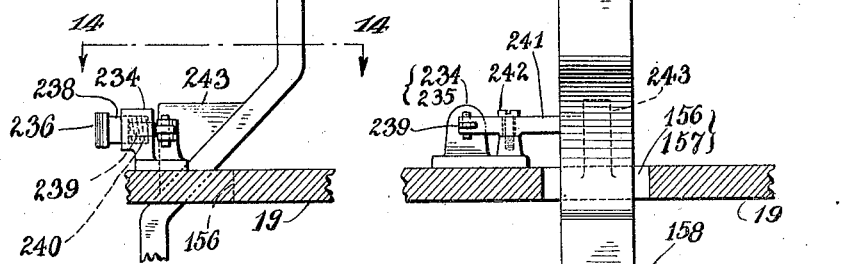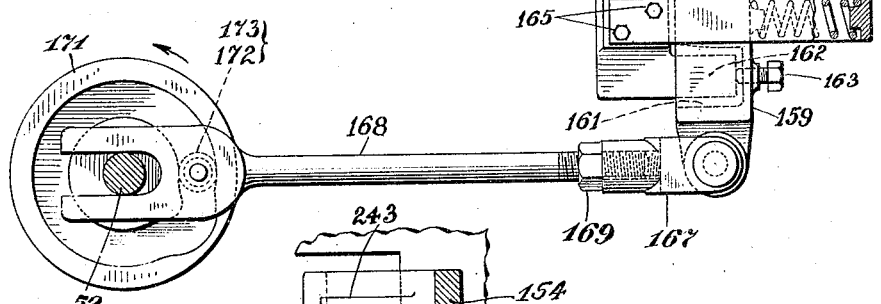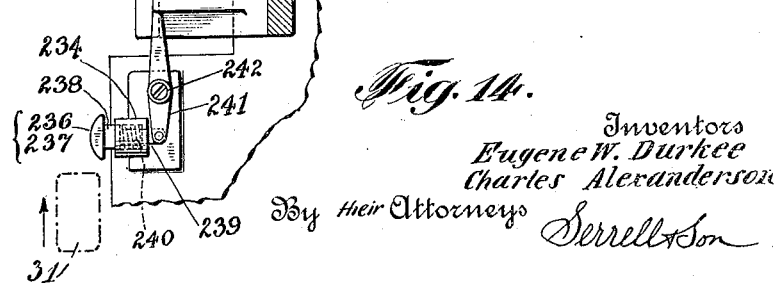

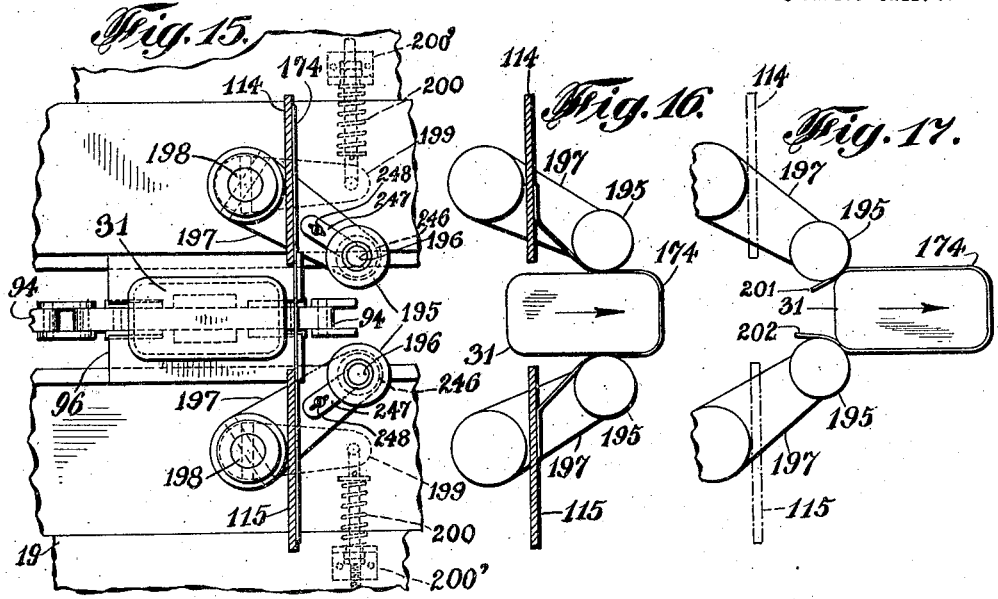
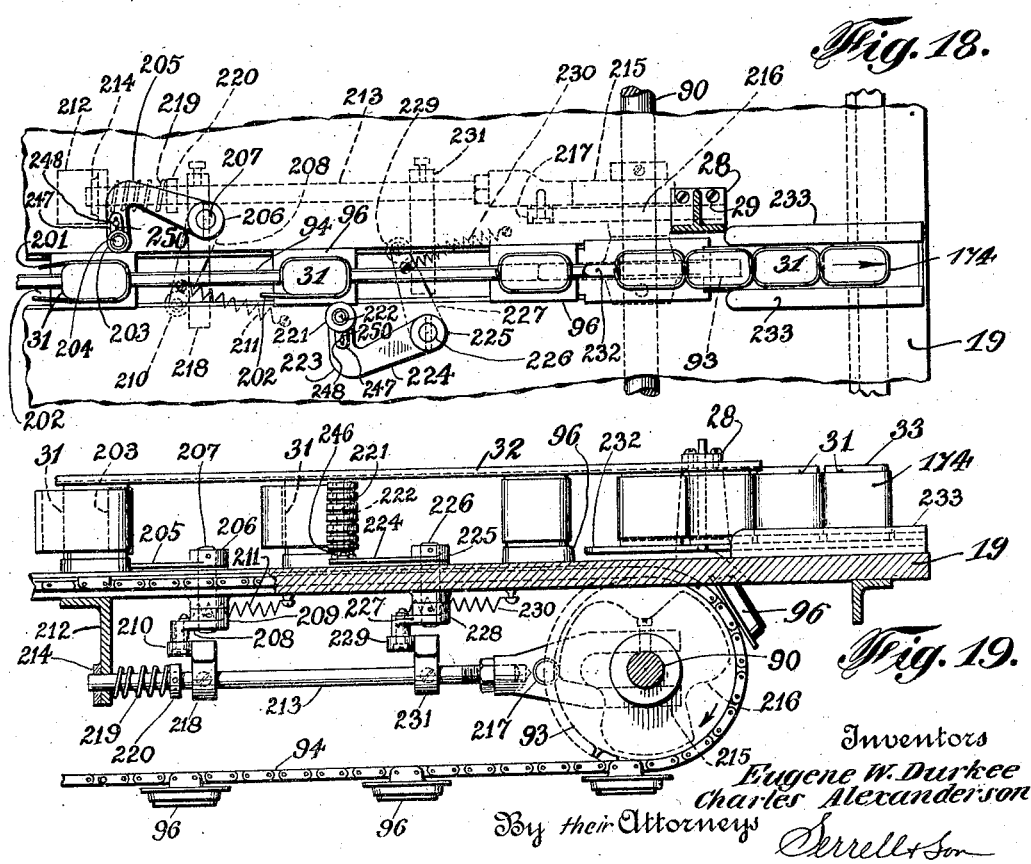

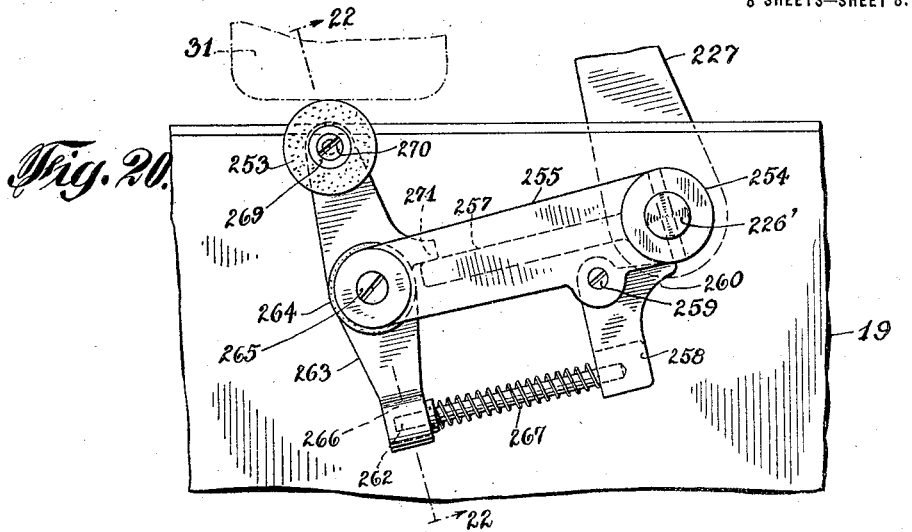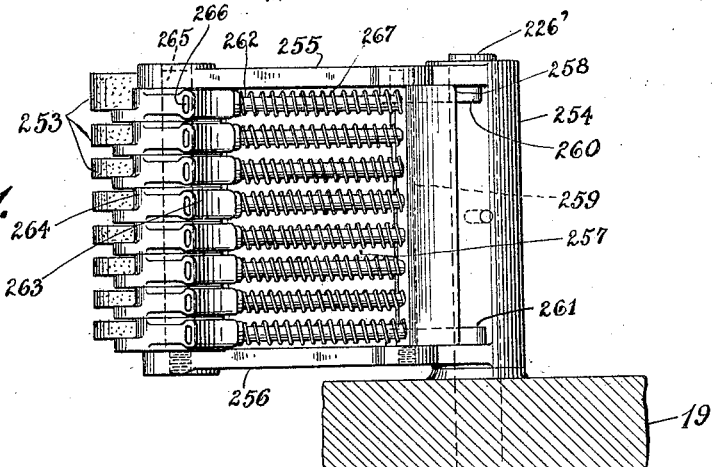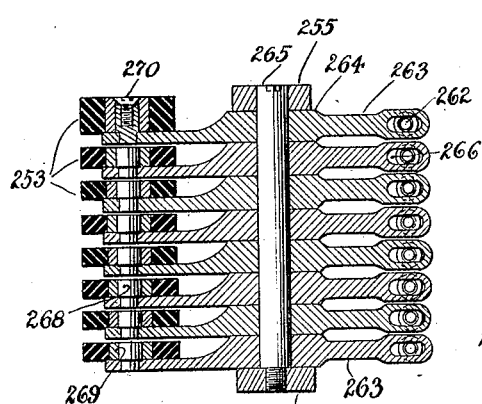

EUGENE W. DURKEE, OF NEW YORK, AND CHARLES ALEXANDERSON, OF BROOKLYN, NEW YORK; SAID ALEXANDERSON ASSIGNOR TO SAID DURKEE.

LABELING MACHINE.

1,405,190.            Specification of Letters Patent.        Patented Jan. 31, 1922.

Application filed April 4, 1921. Serial No. 458,607.

*To all whom it may concern:*

Be it known that we, EUGENE W. DURKEE, a citizen of the United States, residing at the borough of Manhattan, in the city, county, and State of New York, and CHARLES ALEXANDERSON, a citizen of the United States, residing at the borough of Brooklyn, in the county of Kings, city and State of New York, have jointly invented an Improvement in Labeling Machines, of which the following is a specification.

Our invention relates to machines for attaching labels to cans or cartons, and its object is to provide a machine automatic in all its operations, with uniformity of work, rapidity and regularity of action; and consists of the features and details of construction hereinafter described and claimed.

In the accompanying drawing:

Figure 1, is a side elevation of our improved machine.

Fig. 2, is a rear end elevation, looking at the right-hand end of Fig. 1.

Fig. 3, is a top plan view.

Fig. 4, is a detail view of the label carrying frame looking from the front end of the machine.

Fig. 5, is a cross section of the same.

Fig. 6, is a detail view of the stop pins.

Fig. 7, is a plan view of the can carriers.

Fig. 8, is a vertical section of a can, partly broken away, illustrating its recessed bottom.

Fig. 9, is a detail view of the glue reservoirs and means for operating the glue rollers looking from the front end of the machine.

Fig. 10, is a cross section of the same.

Fig. 11, is a detail view of the devices for striking the tops of the covers of the cans as they pass, looking from the rear end of the machine.

Fig. 12, is a front elevation of the label holders and supports, and mechanism for operating the same. Fig. 13, is a side view of the same. Fig. 14, is a detail view of the device for holding the label holders stationary. Fig. 15, is a plan view of the rollers for pressing the labels to the sides of the cans. Figs. 16, and 17, are plan views showing further movements of such rollers. Fig. 18, is a plan view of one form of wipers or rollers for completing the attachment of the labels to the cans, and the mechanism for operating the same. Fig. 19, is an elevation of the same. Fig. 20, is a plan view of the preferred form of wipers for completing the attachment of the labels to the cans, the mechanism for moving the same into contact with and away from the cans being the same as that shown in Figs. 18 and 19, for operating the rollers or wipers shown in said figures. Fig. 21, is a side elevation of the wipers and their support shown in Fig. 20. Fig. 22, is a cross section on the broken line 22—22 Fig. 20; and Fig. 23, is a plan view of one of the roller carrying arms shown in Figs. 20, 21 and 22.

Similar reference characters denote like parts throughout the several views.

The main frame of the machine consists of the uprights 10, 11 and 12; longitudinal cross pieces 14, 15 and 16, and transverse cross pieces 17, 18, which support the bed 19, and on which the various operative parts are secured or mounted.

The bed or table 19 is supported at such height as will admit of convenient access to an operator or operators standing on the floor.

The machine is double acting, that is, the can feeding, gluing, and label applying devices are duplicated driven by the same primary power and acting in unison, but either half of the machine may be made use of separately when desired.

The can feeding is begun by an operator or operators standing at the left hand end of the machine as shown in Fig. 1, by placing the cans upon the endless belt or belts 20, which pass over rollers 21 and 22, mounted on the transverse shafts 23 and 24 journaled in bearings 25, 26 on the frame. These endless belts 20, also ride over longitudinal strips 27, supported upon the bed 19. The purpose of these strips 27, is to prevent sagging of the belts. The table or bed 19, is slotted for the passage of the belts 20.

At opposite sides of the belts 20, there are upright brackets 28, secured to the top of the table 19, by bolts 29 or other suitable means; these brackets support vertical parallel strips 30 extending longitudinally of the bed on either side of the belts 20, forming side guides for the cans 31. The brackets 28 also support the top guide strips 32, the longitudinal edges of which are bent downwardly at right angles.

These top strips are supported at a height slightly above the tops of the can covers 33, so that the cans when drawn along upon the belts, will pass thereunder without danger of contact with the forward ends of such strips.

34, indicates a drive pulley, fixed to the transverse shaft 35, journaled in suitable bearings 36, 37 on the frame.

The drive pulley 34, may be operated by any suitable source of power. We have shown a motor 38, for this purpose, supported upon a bracket 39, fixed to the frame.

There is a pulley 40, fixed on the motor shaft 41, a drive belt 42, passing over the same and the drive pulley 34.

43 is a clutch for connecting the drive shaft which clutch is operated by a lever 44.

Fixed to one end of the shaft 35, is a pinion 45, which engages a cog-wheel 46, fixed on a transverse shaft 47, journaled in bearings 48 and 49, on the frame. Upon the other end of the shaft 47, is fixed a pinion 50, which engages a cog-wheel 51, fixed on one end of the main shaft 52, which is journaled in bearings 53, 54 on the frame.

Fixed to the main shaft 52, adjacent its other end is a bevel gear 55, which engages a bevel gear 56, fixed on the lower end of a vertical shaft 57, supported in a bearing 58, upon the frame. Upon the upper end of this vertical shaft 57, is fixed another bevel gear 59, which meshes with a bevel gear 60, fixed upon the transverse shaft 61, upon which shaft is fixed a sprocket 62. A sprocket 63 is fixed upon the endless belt shaft 24, and an endless chain 64 passes over such sprocket 63, and the sprocket 62, upon the shaft 61, by which means the endless belts 20, are kept in motion.

Upon the bed 19, adjacent the inner edge of each of the endless belts 20, and at a predetermined distance from the forward ends of the top guide strips 32, is mounted an upright bracket 65, having a right angle arm 66, at the upper end provided with an opening in its center, through which extends in each bracket a vertical rod 67, screw threaded on their upper and lower ends.

These vertical rods also pass through holes in the bed or table 19. A spiral spring 68, surrounds each of these rods between the top of the table and a collar 69, on the rods, against which the top of the springs bear, their lower ends bearing upon the top of the table.

A horizontal arm 70, is secured to each of the vertical rods 67, adjacent their upper ends above the tops of the brackets 65, nuts 71, being screwed upon the upper ends of the rods and turned down upon the upper surface of said arms 70. Upon each free end of the arms 70, integral therewith is a downwardly turned right angle lug 72, which passes into and through slots in the top piece 32, when the machine is in operation.

73, indicates a transverse shaft, the ends of which are journaled in bearings 74, upon brackets 75, depending from the top member of the frame at each side of the machine. Upon the shaft 73, are fixed two cams 76, which function with the rolls 77, upon the lower ends of the two vertical links 78, provided with elongated slots 79, through which the shaft 73 passes. These links are bent at right angles at their upper ends which portions are provided with an opening through which the lower ends of the rods 67 extend and to which they are secured by the lock nuts 80.

The shaft 73, is rotated by means of the sprocket chain 81, which engages the sprocket wheel 82, fixed to said shaft and a sprocket wheel 83, fixed to the shaft 61.

The object of this arrangement is to insure the covers of the cans being fully pressed down to place upon the tops of the cans as they pass under the top guide strips 32, the lugs 72, being given an up and down movement through the action of the cams 76, rollers 77, and springs 68 whereby the top of the cover of each can as it passes will be struck by the lugs 72, and pressed fully down upon the can, should it have accidentally been insufficiently placed previously.

As the cans leave the endless belts 20, they pass over horizontal plates 84, the sides of which are cut away at a predetermined distance from their forward ends leaving a space at each side of such plates for the passage of the can carriers hereafter described. The foremost can on each side of the machine contacts with a headed stop pin 85, arranged in the side strips 30. The heads only of these stop pins project through openings in the side strips, there being a flange 86, upon each pin which bears against the outer side of the strips 30, limiting the forward movement of the pins, the rear ends of which are within a recess in blocks 87 attached to the side strips by screws 88, or other suitable means. Spiral springs 89, surround the pins within such recesses and normally press the heads of the pins through the openings in the side strips.

The heads of these pins are rounded, and offer only sufficient resistance to check the forward movement of the cans at this point, but the tension of the springs 89, is easily overcome, when the cans are moved by the means next described. 90 indicates a transverse shaft the ends of which are journaled in bearings 91, upon brackets 92, depending from the top of the frame at each side of the machine.

A sprocket wheel 93, is fixed to the shaft 90, a sprocket chain 94 engages the wheel 93, and also the sprocket wheel 95, fixed to the shaft 61.

Can carriers 96, provided with a longitudinal recess in their upper surface are secured to the sprocket chain 94, at uniform spaced distances. These carriers 96, are of a size and shape to fit into the recessed or depressed bottoms of the cans, so that the cans are carried in regular spaced relation to each other thereby, the movement of the chain 94, being so timed that as each carrier 96, passes into the horizontal position at the top of the chain it engages one of the cans and carries it forward, easily overcoming the resistance of the stop pins 85. The upper position of the carriers on each side of the recesses therein pass into and through the longitudinal spaces on each side of the plates 84.

At each side of the machine and forming a part of the frame there is a post 97, these being in alignment with each other, and each provided with a longitudinal groove 98, in their facing sides.

99, denotes a rectangular frame supported by and between the posts 97. This frame comprises a top cross piece 100, bottom cross piece 101, and side pieces 102, and 103, each side piece being provided on its outer surface with a longitudinal rib 104, which ribs fit slidably into the grooves 98, in the posts 97. The frame 99, is given an up and down movement by the means next described.

One end of a lever 105 is pivoted to a bracket 106, depending from the upper part of the frame. The other end of the lever is pivotally connected to the upper end of a link 107, the other end of said link being pivotally connected in the bifurcated head 108 of a screw threaded bolt 109, which passes through a hole in the lower cross piece 101, of the frame 99.

This bolt is secured by the lock nuts 110, 111. A cam 112, fixed to the main shaft 52, acting upon a roll 113, upon the lever 105, raises the lever and thereby the frame 99, through the link 107 or allows the frame to fall by gravity when the cam passes off said roll.

114, 115 indicate two spaced plates of like construction on each side of the machine secured in vertical position to the top cross piece 100, of the frame 99, by screws or rivets 116, or in any suitable manner. The space between each pair of these plates is in alignment with the respective rows of cans being fed forward; such spaces being of a width slightly greater than the width of the cans, so that the cans may pass through such spaces when the frame is in its lowermost position.

The bed and longitudinal guide strips are transversely slotted to allow for the passage of the frame 99.

118, 119 indicate two glue reservoirs, one on each side of the machine, and supported by brackets 120, 121, the lower ends of which are integral with a hub 122, mounted on a sleeve 117, upon the stationary transverse shaft 123. These glue reservoirs each have an open concave end adjacent the glue rollers 124, which openings the glue rollers cover.

An adjustable bottom plate 125, is fitted in each reservoir, the front edge of which plate is preferably beveled and is adapted to engage the surface of the glue rollers or to be adjusted to any desired degree of proximity thereto, by means of the adjusting screws 126. The glue rollers are fixed to the shafts 127, 128, the ends of which are supported in bearings 129, 130, on the uprights 131, 132, secured to the brackets 120, 121.

A pinion 133, is fixed on the inner end of each glue roller shaft, which pinions engage cog-wheels 134, 135 fixed to a shaft 136, supported in bearings upon the vertical central extension 137, of the brackets 120, 121.

A sprocket wheel 138, is fixed to the shaft 136, between the cog-wheels 134, 135, and is engaged by a sprocket chain 139, which also engages a sprocket wheel 140, keyed to the sleeve 117, on the shaft 123.

This sleeve 117, is rotated by means of the sprocket chain 141, which passes over a sprocket wheel 142, fixed to said sleeve and over another sprocket wheel 143, fixed to the main shaft 52.

There is an opening 144 in the bed 19, through which the brackets and sprocket chain extend.

Between the extreme lower ends of the brackets 120 and 121, there is pivotally connected one end of a coupling 145, its other end having a threaded recess, into which is screwed one end of a rod 146, which is retained in position by a lock nut 147. The other end of this rod 146, is forked and straddles the main shaft 52.

A cam 148, keyed to the main shaft 52, acts upon the roll 149, upon the rod 146, by means of which the brackets 120, 121 are periodically rocked forward carrying the glue rollers 124, into position to contact with the plates 114, 115 on the upward movement of the frame 99, whereby said plates receive an adhesive coating on their inner surfaces.

150 and 151, indicate two label holders arranged parallel to each other and supported upon brackets 152 and 153, extending from the carrier arms 154 and 155. These arms pass through openings 156 and 157, in the bed 19, at opposite sides of the machine, their ends below the bed being in vertical alignment, extending through the openings in the bed in outwardly and upwardly inclined form for a predetermined distance, above which they again extend in vertical alignment. Upon the vertical portions of these arms 154 and 155, at a predetermined distance below the bed 19, and upon the rear of said arms there are integral lugs 158 loosely mounted upon the shaft 123. Links 159, 160 are also loosely mounted upon the shaft 123 and extend downwardly, there being a recess 161, in each link into which extends a right angle projection 162, of the lower ends of the arms 154 and 155, with a set screw 163, passing through threaded opening in the links and bearing upon the ends of said projections.

Horizontal brackets 164, are secured at their forward forked ends to each of the lower ends of the arms 154 and 155, by screws or bolts 165, or other suitable means, and are provided with slots through which the links 159 and 160 pass. A spiral spring 166, is contained in said brackets between their rear ends and said links. The relative position of the links and arms 154 and 155 may be regulated by the set screws 163.

To the extreme lower end of each link 159 and 160, is pivotally connected one end of a coupling 167, the other ends of which are provided with a threaded recess into which is secured the threaded ends of the rods 168, which are held in place by lock nuts 169.

The free ends of these rods 168, are forked and straddle the main shaft 52. Rolls 172 and 173 on the respective rods 168 acting in the grooved cams 170 and 171 fixed on the main shaft 52, rock the carrier arms 154 and 155 forward carrying the label holders 150, 151 against the plates 114, 115, the operation of the parts being so timed that this occurs when the frame 99, has been raised to its extreme upward movement, and the plates have received a supply of adhesive from the glue rollers.

The labels 174, are placed in the holders 150, 151, in a vertical position with their backs or blank surfaces facing forward toward the frame 99. A screw threaded shaft 175 is supported in bearings 176, in the uprights 177, at the outer side of each label holder. A sleeve 178, having a smooth interior surface surrounds each threaded shaft 175. An integral arm 179, extends horizontally from each sleeve and is provided with a lug 180, bearing upon the upper surface of the brackets 152, 153. A semi-circular jaw 181, fits into a slotted portion of each sleeve 178 and covers the upper half of each shaft 175, the interior surface of these jaws 181, being threaded and engaging the threads of the shafts 175. These jaws are also each provided with an integral arm 182, extending parallel with the arms 179, and pivotally connected thereto as at 183 and 184. Springs 185 located between the arms 179 and 182, normally hold the jaws 181 in engagement with the screw shafts 175, but by depressing the outer ends of the arms 182, the jaws 181, will be raised clear of the screws allowing the sleeves 178 to be moved either forward or backward along the shafts.

The labels are placed forward of projections 245, extending from the sleeves, so that such projections act as pushers as well as supporting the stack of labels at the rear. While the labels are being placed in their holders, the sleeves 178, are moved backward by raising the jaws 181, and when the desired number of labels have been inserted, the sleeves are moved forward against the stack when the upper jaws are allowed to drop and engage the threaded shafts, whereby the sleeves will be carried forward when the shafts are rotated, pushing the labels in front of them.

There is a spiral gear 186, on the forward end of each shaft 175, which engages a spiral gear 187 on each shaft 188, supported in bearings 189, on the brackets 152, 153.

A ratchet wheel 190, is fixed to each of the shafts 188, which when the label holders are carried forward in the manner before described, engage the pawls 191, pivotally secured to the outer surfaces of the side posts 97, of the frame, whereby the ratchet wheels are rotated one tooth at a time giving a partial rotation to the shafts 188, and through the action of the spiral gears 187 and 186, rotating the shafts 175, sufficiently to carry the pushers 245 far enough forward to push the foremost label in each holder against the glue covered surfaces of the plates 114, 115. The label holders 150, 151, are moved back into their normal horizontal position by the rolls 172, 173 acting in the cam grooves 170, 171 thus releasing the pawls 191, from engagement with the ratchet wheels 190, when the heavier rear ends of the pawls drop upon the stops 192, fixed to the side posts 97, lifting the forward ends of the pawls into position to again engage the teeth of the ratchet 190, when the label holders are again brought forward.

The forward end of each label holder is provided with fingers 193, for normally holding the stacks of labels in position at the front, and when the label holders are carried forward against the glue covered plates 114 and 115, these fingers enter the slots 194 in such plates, the foremost label in each holder adhering to the plates with sufficient tenacity to be drawn from the holders and remain upon the plates when the label holders are moved backward. The glue rollers are each preferably provided with a central annular groove 251, which grooves when the rollers contact with the plates 114 and 115, are in alignment with the slots 194, in said plates so that no glue will enter such slots.

The extreme downward movement of the frame 99, brings the bottom edges of the plates 114, 115 in contact with the top of the bed 19, with the spaces between the respective pairs of plates, in line with the rows of cans being carried along by the can carriers 96, the forward ends of the advancing cans passing through such spaces against the centers of the labels and drawing such labels off the plates as the cans continue their movement.

As each can passes out through the spaces between the plates, it is engaged on both sides by a pair of vertically disposed rollers 195, which rollers press the glue covered sides of the labels against the sides of the cans causing the labels to adhere thereto.

These rollers 195, are preferably covered with rubber which is preferably corrugated. The rollers are each loosely mounted upon vertical spindles 196 fixed at their lower ends to the free ends of arms 197, the other ends of said arms being fixed to the tops of pivot pins 198 above the table top, such pivot pins passing through bearings in the table or bed 19 and each having fixed to its lower end below the table another arm 199, to the free end of which is attached one end of a spiral spring 200, the other ends of such springs being connected to the frame as at 200'. The compression of these springs is sufficient to cause the rollers 195, to press the gummed labels tightly against the sides of the cans as they pass between the rollers and cause the labels to smoothly adhere to the sides of the cans.

The action of these rollers is best illustrated in Figs. 15, 16 and 17 of the drawings. Fig. 15, illustrates the action of the rollers as the labels are being drawn from the plates 114—115, by the advancing can, and Fig. 17, shows the position of the rollers and labels as the rollers pass off the rear ends of the cans.

The labels are preferably so shaped that the gummed ends 201 on the left hand sides of the cans not yet pressed against the cans when the rollers 195 pass off the cans are slightly shorter than the ends 202 on the right sides of the cans, as shown in Figs. 17 and 18.

As the foremost can in each row or rows passes from between the rollers 195, it comes in turn into contact with spaced wipers or rollers which in turn act upon the opposite sides and ends of the can or cans to smooth the labels thereon and fold and press the ends of the labels over and upon the end of the can or cans.

The preferred form of these wipers is shown in detail in Figs. 20 to 22 inclusive, but in Figs. 1, 2, 18 and 19, we have shown vertical rollers 203 and 221, which may be employed for this purpose, the shorter ends 201 of the labels being acted upon by the rollers 203, and the longer ends 202 of the labels being acted upon by the rollers 221.

The rollers 203 should be of such diameter that they will not come in contact with the glued surface of the end flaps on the right hand sides of the cans while pressing the left hand flaps against the rear ends of the cans. There are two rollers 203, one for each row of cans, and they are provided with a rubber covering. These rollers are each loosely supported upon a vertical axle 204 the lower ends of which are each fixed to one inwardly curved end of the arms 205, above the bed 19, the other ends of such arms each being provided with a hub 206, secured to the top of a vertical shaft 207, passing through the bed. Below the bed there is another arm 208, provided with a hub 209, secured to the lower end of the shaft 207, which arm is arranged at an angle to the upper arm 205. To the free end of each of the arms 208, there is secured a roll 210. To each of the arms 208, adjacent its free end there is secured one end of a spiral spring 211, the other ends of such springs being secured to the under side of the bed. These springs 211, tend to swing the arms 205 and 208 on the shafts 207, so as to bring the rollers 203, against the left hand sides of the cans at the desired moment to press the shorter ends of the gummed labels against the rear ends of the foremost can or cans at the proper time. The rollers 203, are moved out of contact with the cans at the desired moment by the means next described. 212 denotes two brackets attached to the under side of the table and depending therefrom one at each side of the machine.

A horizontal rod 213, is supported at one end slidably in a bearing 214, in each of said brackets; the other ends of each of these rods 213, is threaded and screwed into a threaded recess in a forked member 215, which straddles the transverse shaft 90. Cam wheels 216 are keyed to said shaft 90 and contact with a roll 217, on each of said forked members 215, as the shaft 90, is rotated. There is a block 218 fixed to each of the rods 213, at a predetermined distance from its end supported in the brackets 212, which blocks as the rods 213, are moved forward by the action of the cam wheels 216, on the rollers 217, strike the rollers 210, on the arms 208, swinging said arms and the arms 205 on the vertical shafts 207, carrying the rollers 203 away from the cans. A spiral spring 219 surrounds each rod 213, between the brackets 212 and a collar 220, fixed to each of said rods, which springs are compressed when the rods are moved forward by the cam wheels acting upon the roll 217, but expand when the cam wheel passes off said roll, forcing said rods backward and carrying the blocks 218, away from the rollers 210, which rollers are again brought into contact with the cans, by the contraction of the springs 211.

At a predetermined distance beyond the rollers 203, at the opposite side of the row of cans, the rollers 221, are arranged to act upon the right hand sides of the cans and press the longer ends 202 of the labels over and against the rear ends of the cans in a similar manner to the action of the rollers 203, on the shorter ends of the labels. These rollers 221, may be of somewhat greater diameter than the rollers 203, and are covered with corrugated rubber. The mechanism for operating the rollers 221, is similar to that for the operation of the rollers 203, that is, the rollers 221, are loosely mounted on a vertical axis 222, the lower ends of which are fixed to the inwardly curved ends 223, of arms 224, above the table 19, the other ends of such arms each having a hub 225, secured to the top of a vertical shaft 226, passing through a hole in the bed 19.

Below the bed there is another arm 227, provided with a hub 228, secured to the lower ends of the respective shafts 226, which arms are positioned at an angle to the upper arms 224. To the free end of each of these lower arms 227, there is secured a roll 229. To each of the arms 227, adjacent its free end there is secured one end of a spiral spring 230, the other end of which is secured to the under side of the bed. These springs 230, swing the arms 227 on the shafts 226, bringing the rollers 221, against the right hand sides of the cans at the desired moment, or immediately after the rollers 203, have operated upon the opposite sides of the cans as before described to press the longer ends of the gummed labels against the rear ends of the foremost can in each row at the proper time. The rollers 221, are moved out of contact with the cans at the proper moment by the action of the cam wheels 216, upon the roll 217, on the horizontal rods 213, there being another block 231, secured to each of said rods which contacts with the rolls 229, on the arms 227, when the rods are moved forward by said cams. When the rods 213 are forced backward by the springs 219, as each cam on the cam wheel 216, passes off the rolls 217, the blocks 231, are moved out of contact with the rollers 229, when the rollers 221, are again brought into contact with the right hand side of a can in each row, by the contraction of the springs 230.

In cases where these rollers 203 and 221 are employed, we prefer to provide each roller near its lower end with an annular groove 246, into which fits the recessed or forked end of a flat spring 247, the other ends of which springs are held to the respective arms carrying the spindles for the rollers, by a screw 248, which passes through a longitudinal slot 250, in said springs and into a threaded hole in the arms. When these screws are slightly loosened, the recessed or forked ends of the springs may be drawn back out of the grooves in the rollers, so that the rollers may be easily lifted off their spindles for the purpose of cleaning the same when necessary or desired.

While the wipers or rollers 203 and 221, may be employed when desired, we prefer that these rollers or wipers be made in sections or a series of superposed flat rollers or disks 253 of rubber or other flexible material, supported by brackets which are mounted on and fixed to the vertical shafts 207 and 226 respectively, in which case said shafts are lengthened above the top of the bed 19, for connection with said brackets as illustrated in Figs. 20, 21 and 22. In these figures, the last set of wipers, or those to take the place of the rollers 221, are shown; it being understood that the same construction of wipers is to take the place of the wipers or rollers 203, on each side of the machine, and that the shafts 207 and 226 are rotated in the same manner and by the same mechanism as shown and described for operating said shafts when the rollers or wipers 203 and 221 are employed.

The brackets for supporting the flexible disks or rollers 253, each consists of a vertically elongated hub 254, provided with a central longitudinal opening through which the upper ends 226' of the vertical shafts 207 and 226 pass and to which the bracket hubs are keyed or fixed in any suitable manner.

Flat arms 255 and 256, integral with the hubs 254, extend at right angles from the hubs in parallel line one at the top and the other at the bottom of said hubs, a web 257, integral with the hub and also integral with said arms extending between the longitudinal centers of the arms to within a predetermined distance from their free ends. Adjacent the hub in each bracket between the arms 255 and 256, there is a frame 258, pivotally connected to said arms by a rod or pivot pin 259.

These frames 258, are provided at the top and bottom with rearwardly curved lugs 260 and 261, which bear upon the hubs 254.

In the inner surface of each frame 258, adjacent its outer edge there are a plurality of threaded recesses in vertical alignment into which are screwed the threaded ends of rods 262, so that these rods extend from the frames at right angles in superposed parallel lines.

263, indicates a plurality of superposed parallel arms provided with hubs 264 at their longitudinal centres which hubs are each provided with a central opening.

These series of arms 263 are pivotally connected between the free ends of the bracket arms 255 and 256 by pivot pins 265, which pass through openings in said bracket arms and through the openings in the hubs 264, of said arms 263.

One end of each of the arms 263, is provided with an elongated longitudinal slot 266, into which project the free ends of the respective rods 262.

A spiral spring 267, surrounds each of the rods 262, between the inner surfaces of the arms 263 and the frames 258, which springs normally hold the respective arms 263, in alignment. A lug 271, on each of the arms 263, bearing against the web 257, limits the movement of said arms in that direction. The other ends of the arms 263, are flat and are each provided with a vertical pivot pin 268, upon which the respective rollers or disks 253, are mounted, said disks each having a central opening provided with a bushing 269 into which the said pivot pins pass. The pivot pin on the top arm is preferably threaded interiorly to receive a screw 270, for preventing the top roller or disk working off the pin, the bushing in this roller being countersunk at the top to allow the screw to be turned down so that its head will be flush with the top of the roller. These disks or rollers 253 are all of the same diameter, but may be of any desired thickness.

It will be readily seen that each of these disks or rollers 253 has a movement independent of the others, so that should there be any inequality or bulging in the sides of a passing can with which these disks contact, the independent action of such disks will insure the labels being pressed against the cans at all points.

The action of the last set of disks or rollers upon the cans, completes the application of the labels thereto, and each can in turn passes from contact with such rollers with a label uniformly and smoothly applied to it.

The labeled cans continue their spaced travel until each in turn reaches the rear end of the sprocket chain 94, where the carriers 96, loose their hold upon the can bottoms, as the cans pass upon a horizontal plate 232, on each side of the machine upon which they are pushed along by the next following can, and pass into guideways 233, leading to any suitable table or receptacle from which they may be taken for packing.

As will be understood from the foregoing description the can feeding belts, guides, label holders, label feeding means, glue reservoirs, and means for operating the same; also the rollers for pressing the glued labels upon the cans, and means for operating the same are all duplicated, one complete set being arranged on each side of the machine in parallel line; and it will be further understood that both sets may be made use of at the same time, or either set used separately when desired.

When only one side is being used, it is preferable to empty the glue reservoir on the other side, or that reservoir may be temporarily removed from the machine. The label holders on the side of the machine not being made use of may also be emptied or left free of labels, but one important feature of our invention consists in the provision of means whereby no labels will be fed against the glue covered plates when a can does not pass a certain point.

This feature is next described.

234 and 235 denote two upright brackets secured to the top of the bed 19, on each side adjacent the openings 156 and 157, through which the arms 154 and 155 pass. These brackets have a hollow center with aligned holes on either side thereof.

236 and 237 indicate two cams, having necks 238, and straight stems 239, projecting therefrom. These stems pass through the aligned holes in the respective brackets 234, 235 and a spiral spring 240, surrounds such stems within the hollow center of the brackets.

To the end of each stem 239, projecting from the brackets there is pivotally connected one end of a lever 241, fulcrumed at 242, the other ends of these levers bearing against a lug 243, upon each of the arms 154 and 155, which normally hold such arms in a vertical position. The cams 236 and 237, are in the path of the advancing cans to which the labels are to be applied, and as a can passes it comes in contact with the cam pushing its neck into the opening in the bracket against the tension of the spiral spring therein thereby swinging the lever out of contact with the lug upon the arm or arms 154, 155, or both, leaving such arm or arms free to be rocked forward in the manner hereinbefore described. When the can or cans lose contact with the cam or cams, the spiral springs 240, expand forcing the cams into position to be again operated in the same manner by the next following can. It will therefore be seen that when no can passes either of the cams 236 or 237, the label holder on that side of the machine will remain stationary, and no label will be either glued or fed from the holder. This arrangement does not interfere with the action of the cams 171, on the rolls 172, 173 and movement of the rods 168, because while the tension of the springs 166, in the brackets 164, is sufficient to compel the rocking of the arms 154, 155, on the shaft 123, when the levers 241, are out of contact with the lugs 243, such springs 166, are compressed upon the action of the cams 170, 171, against the roll 172, 173, while the levers 241 are in engagement with the lugs 243, thus allowing the lower end of the links 159, 160, to swing backward from the arm 154 or 155, without such arm being moved.

It is obvious that the machine may be used for applying labels to cans or cartons of various size and shape by simply making mechanical changes and without departing from the spirit of our invention.

We claim as our invention:

1. In a machine for attaching labels to cans, the combination of a frame and bed supported thereby, a transverse frame slidable vertically in the main frame, a pair of spaced plates carried by said transverse frame, means for giving an up and down movement to said transverse frame, glue rollers, means for bringing the same against said plates on their upward movement, a label holder, means for rocking the same into contact with said plates after they have received the adhesive from the glue rollers, whereby the foremost label in the holder will be caused to adhere to said plates, a guideway for the cans upon the bed in line with the space between said plates, an endless belt traveling in said guideway and carrying the cans forward, means for driving said belt, means supported upon the bed for pressing upon the cover of each can as it passes, spaced carriers for engaging each can as it passes off said belt and by which the cans are carried through the space between said plates.

2. In a machine for attaching labels to cans, the combination of a frame and bed supported thereby, a transverse frame slidable vertically in the main frame, a pair of spaced plates carried by said transverse frame, means for giving an up and down movement to said transverse frame, glue rollers, means for bringing the same against said plates on their upward movement, a label holder, means for rocking the same into contact with said plates after the plates have received the adhesive from the glue rollers, whereby the foremost label in the holder will be caused to adhere to said plates, a guideway for the cans upon the bed in line with the space between said plates, an endless belt traveling in said guideway upon which the cans are carried, means for driving said belt, a spring actuated stop pin within said guideway at a predetermined point beyond the end of said belt for temporarily checking the movement of the cans, spaced can carriers engaging the cans and overcoming the action of said stop pins whereby the cans are carried through the space between said plates and draw the labels therefrom, a pair of rollers engaging both sides of the passing can to press the label thereon, and means bearing against both sides of the cans to smooth the labels thereon and fold the ends of the labels over and upon the rear ends of the cans.

3. In a machine for attaching labels to cans, the combination of a frame and bed supported thereby, a transverse frame slidable vertically in the main frame, a pair of spaced plates carried by said transverse frame, means for giving an up and down movement to said transverse frame, glue rollers, means for bringing the same against said plates on their upward movement, a label holder, means for rocking the same into contact with said plates after they have received the adhesive from the glue rollers, whereby the foremost label in the holder will be caused to adhere to said plates, a guideway for the cans upon the bed in line with the space between said plates, an endless belt traveling in said guideway and carrying the cans forward, means for driving said belt, means supported upon the bed for striking the cover of each can as it passes, spaced can carriers for engaging each can as it passes off said belt and by which the cans are carried through the space between said plates whereby the label adhering to said plates will be drawn therefrom by the can, rollers engaging said can and pressing the label thereupon, and means for preventing the forward movement of the label holder when no cans are passing through the guideway.

4. In a machine for attaching labels to cans, the combination of a frame and bed supported thereby, a transverse frame slidable vertically in the main frame, a pair of spaced plates carried by said transverse frame, means for giving an up and down movement to said transverse frame, glue rollers, means for bringing the same against said plates on their upward movement, a label holder, means for rocking the same into contact with said plates after the plates have received an adhesive from the glue rollers, whereby the foremost label in the holder will be caused to adhere to said plates, a guideway for the cans upon the bed in line with the space between said plates, an endless belt traveling in said guideway upon which the cans are carried, means for driving said belt, a spring actuated stop pin within said guideway at a predetermined point beyond the end of said belt for temporarily checking the movement of the cans, spaced can carriers for engaging the cans and overcoming the action of said stop pins whereby the cans are carried through the space between said plates and draw the labels therefrom, a pair of rollers engaging both sides of the passing can to press the label thereon, spaced wipers bearing against the cans to smooth the labels and fold the ends of the labels upon the rear ends of the cans, and means for preventing the forward movement of the label holder when no cans are passing through the guideway.

5. In a labeling machine, the combination of a supporting frame, a transverse frame slidable vertically in the main frame, a pair of spaced plates carried thereby, means for imparting an up and down movement to said transverse frame, glue rollers, means for bringing the same against said plates on their upward movement, a label holder, a threaded shaft supported at one side thereof, means connected with said shaft whereby the labels are moved forward in the holder when the shaft is rotated, means for periodically rotating said shaft, and means for rocking the holder forward into contact with said plates after they have received the adhesive from the glue rollers whereby the foremost label is caused to adhere to said plates.

6. In a machine for attaching labels to cans, the combination of a frame and bed supported thereby, a transverse frame slidable vertically in the main frame, a pair of spaced plates carried thereby, means for imparting an up and down movement to said transverse frame, glue rollers, means for bringing the same against said plates on their upward movement, a label holder, a threaded shaft supported at one side thereof, means connected with said shaft whereby the labels are moved forward in the holder when the shaft is rotated, means for periodically rotating said shaft, means for rocking the holder forward into contact with said plates after they have received the adhesive from the glue rollers whereby the foremost label is caused to adhere to said plates, a guideway for the cans upon the bed in line with the space between said plates, and means for carrying the cans through such space.

7. In a labeling machine, the combination of a supporting frame, a transverse frame slidable vertically therein, a pair of spaced plates carried thereby, means for imparting an up and down movement to said transverse frame, glue rollers, means for bringing the same against said plates on their upward movement, a label holder, a threaded shaft support at one side thereof, a pusher bearing against the labels in the holder, gears, ratchet wheel and pawl for periodically giving a partial rotation to said shaft, and means for rocking the label holder forward into contact with said plates after they have received the adhesive from said glue rollers whereby the foremost label is caused to adhere to said plates.

8. In a labeling machine, the combination of a supporting frame, a transverse frame slidable vertically therein, a pair of spaced plates carried by said transverse frame, means for imparting an up and down movement to said transverse frame, glue rollers, means for bringing the same against said plates on their upward movement, a label holder, a threaded shaft supported at one side thereof, a gear fixed to one end of said shaft, a sleeve provided with a slot and having a smooth interior surface upon said shaft, a semi-circular jaw threaded on its interior fitted into said slot in the sleeve, means for raising said jaw out of said slot to permit said sleeve to be slid backward or forward upon said shaft, a spring for normally holding said jaw in engagement with the shaft, a pusher connected with said sleeve, a gear engaging said gear on the end of said shaft, a ratchet wheel and pawl whereby a partial rotation is periodically given such shaft, and means for rocking the holder forward into contact with said plates after they have received the adhesive from the glue rollers.

9. In a machine for attaching labels to cans, the combination of a main frame and bed supported thereby, a transverse frame slidable vertically in the main frame, a pair of spaced vertical plates attached to the upper part of said transverse frame on each side thereof, means for giving an up and down movement to said transverse frame, a pair of glue rollers at each side of the machine, means common to both pairs of glue rollers for bringing same against the respective pairs of plates on the upward movement of said plates, two label holders, one at each side of the machine, means for moving the same forward into contact with the respective pairs of plates after said plates have received the adhesive from the glue rollers whereby the foremost label in each holder is caused to adhere to said plates, means for periodically moving the labels forward in each label holder, a guideway for the cans upon the bed at each side of the machine in line with the space between each pair of said plates, means on each side of the machine for preventing the forward movement of either or both label holders when no cans are passing through the guideways, means for carrying the cans through the spaces between the plates whereby the labels are drawn from said plates by the cans, and a pair of rollers at each side of the machine which contact with both sides of a passing can to press the label thereon.

10. In a machine for attaching labels to cans, the combination of a main frame and bed supported thereby, a transverse frame slidable vertically in the main frame, a pair of spaced vertical plates attached to the upper part of said transverse frame on each side thereof, means for giving an up and down movement to said transverse frame, a pair of glue rollers at each side of the machine, means common to both pairs of glue rollers for bringing same against the respective pairs of plates on the upward movement of said plates, two label holders, one at each side of the machine, means for moving the same forward into contact with the respective pairs of plates after said plates have received the adhesive from the glue rollers, whereby the foremost label in each holder is caused to adhere to said plates, means for periodically moving the labels forward in each label holder, a guideway for the cans upon the bed at each side of the machine in line with the space between each pair of said plates, means on each side of the machine for preventing the forward movement of either or both label holders when no cans are passing through the guideways, means for carrying the cans through the spaces between the plates whereby the labels are drawn from said plates by the cans, and spaced wipers at each side of the machine for pressing and smoothing the labels upon the cans and folding the ends of the labels over the rear ends of the cans.

11. In a machine for attaching labels to cans, the combination of a main frame and bed supported thereby, a transverse frame slidable vertically in the main frame, a pair of spaced vertical plates attached to the upper part of said transverse frame on each side thereof, means for giving an up and down movement to said transverse frame, a pair of glue rollers at each side of the machine, means common to both pairs of glue rollers for bringing same against the respective pairs of plates on the upward movement of said plates, two label holders, one at each side of the machine, means for moving the same forward into contact with the respective pairs of plates after said plates have received the adhesive from the glue rollers whereby the foremost label in each holder is caused to adhere to said plates, means for periodically moving the labels forward in each label holder, a guideway for the cans upon the bed at each side of the machine in line with the space between each pair of said plates, a stop lever and cam for actuating the same at each side of the machine by means of which either or both label holders are held stationary when no can passes said cam in either guideway, means for carrying the cans through the spaces between the plates whereby the labels are drawn from said plates by the cans, and spaced wipers at each side of the machine for pressing and smoothing the labels upon the cans and for folding the ends of the labels over the rear ends of the cans.

12. In a machine for attaching labels to cans, the combination of a frame and bed supported thereby, a transverse frame slidably supported in the main frame, a pair of spaced plates carried by said transverse frame, means for imparting an up and down movement to said transverse frame, glue rollers, means for bringing the same against said plates on their upward movement, a label holder, means for moving the same into contact with said plates after they have received the adhesive from the glue rollers whereby the foremost label will be caused to adhere to said plates, a guideway for the cans upon the bed in line with the space between said plates, means for carrying the cans through said space whereby the gummed label is drawn from said plates by the can, and a stop lever and cam for actuating the same by means of which the label holder will be held stationary when no can contacts with such cam in passing along the guideway.

13. In a machine for attaching labels to cans, the combination of a frame and bed supported thereby, a transverse frame slidable vertically in the main frame, a pair of spaced plates carried by said transverse frame, means for imparting an up and down movement to said transverse frame, glue rollers, means for bringing the same against said plates on the upward movement of said transverse frame, a label holder, means for rocking the same into contact with said plates after they have received the adhesive from the glue rollers whereby the foremost label in the holder will be caused to adhere to said plates, a guideway for the cans upon the bed in line with the space between said plates, means for carrying the cans in spaced relation to each other through said space between the plates whereby the labels will be drawn one at a time from said plates by the cans, a pair of rollers contacting with both sides of the foremost can and pressing the gummed label thereto, spaced wipers for smoothing said labels upon the cans and folding the ends of the labels over the rear ends of the cans, and a stop lever and cam for actuating the same, by means of which the label holder is held stationary when no can contacts with said cam in passing along the guideway.

14. In a machine for attaching labels to cans, the combination of a frame and bed supported thereby, a transverse frame slidably supported in the main frame, a pair of spaced plates carried by said transverse frame, means for imparting an up and down movement to said transverse frame, glue rollers, means for bringing the same against said plates on the upward movement of the transverse frame, a label holder, means for rocking the same forward into contact with said plates after their contact with the glue rollers, a guideway for the cans upon the bed in line with the space between said plates, means for carrying the cans one at a time through said space whereby the gummed label is drawn from said plates by the cans, a pair of rollers contacting with opposite sides of the can, and two sets of wipers for smoothing the labels upon the can and folding and pressing the ends of the label over the rear end of the can, each set embodying a plurality of superposed flexible disks.

15. In a machine for attaching labels to cans, the combination of a frame and bed supported thereby, a transverse frame slidably supported in the main frame, a pair of spaced plates carried by said transverse frame, means for imparting an up and down movement to said transverse frame, glue rollers, means for bringing the same against said plates on the upward movement of the transverse frame, a label holder, means for rocking the same forward into contact with said plates after their contact with the glue rollers, a guideway for the cans upon the bed in line with the space between said plates, means for carrying the cans one at a time through such space whereby the gummed label is drawn from said plates by the cans, a pair of rollers contacting with opposite sides of the can, and two sets of wipers for smoothing the labels upon the can and folding and pressing the ends of the label over the rear end of the can, each set embodying a plurality of superposed flexible disks having independent pivotal movement.

16. In a machine for attaching labels to cans, the combination of a frame and bed supported thereby, a transverse frame slidably supported in the main frame, a pair of spaced plates carried by said transverse frame, means for imparting an up and down movement to said transverse frame, glue rollers, means for bringing the same against said plates on the upward movement of the transverse frame, a label holder, means for rocking the same forward into contact with said plates after their contact with the glue rollers, a guideway for the cans upon the bed in line with the space between said plates, means for carrying the cans one at a time through such space whereby the gummed label is drawn from said plates by the cans, a pair of rollers contacting with opposite sides of the can, two sets of wipers for smoothing the label upon opposite sides of the can and folding and pressing the ends of the label over the rear end of the can, each set comprising a bracket, a plurality of superposed arms pivotally connected thereto at their centers, a flexible disk pivoted upon one end of each arm, the other end of each arm being provided with a slot, parallel rods secured at one end to said bracket with their free ends projecting into said slots in the respective arms, spiral springs surrounding said rods, and means for oscillating said brackets.

Signed by us this 28th day of March, 1921.

EUGENE W. DURKEE.
CHAS. ALEXANDERSON.